Patented July 31, 1951

2,562,583

UNITED STATES PATENT OFFICE 2,562,583

PROCESS FOR MAKING ACRYLONITRILES

Helmut W. Schulz and Albert E. Pufahl, Charleston, W. Va., assignors, by mesne assignments, to Union Carbide and Carbon Corporation, a corporation of New York No Drawing. Application December 29, 1948, Serial No. 68,095

6 Claims. (Cl. 260—465.2)

This invention relates to an improved method for making acrylonitrile and methacrylonitrile.

Our process involves the simultaneous dealcoholation and dehydration of a beta-alkoxypropionamide to form an acrylonitrile. The reaction which occurs may be represented as follows:

(1) $ROCH_2CHR_1CONH_2 \rightarrow$
a Beta-alkoxy propionamide

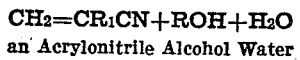
an Acrylonitrile Alcohol Water where R is an alkyl radical containing up to six carbon atoms, in particular a methyl, ethyl or butyl radical, and $R_1$ is hydrogen or methyl.

It will be seen from Equation 1 above that our invention involves simultaneously splitting out simple molecules from both ends of the beta-alkoxypropionamide molecule, thus avoiding the formation of substantial amounts of those products which are formed when only one end of the beta-alkoxypropionamide molecule takes part in the reaction. Thus, when only the amide group is dehydrated, a beta-alkoxynitrile is formed as follows:

(2) $ROCH_2CHR_1CONH_2 \rightarrow ROCH_2CHR_1CN + H_2O$

When only the alkoxy group is split out, an acrylamide is formed as follows:

(3) $ROCH_2CHR_1CONH_2 \rightarrow$

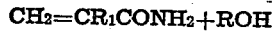

The method which we have found suitable for the simultaneous dealcoholation and dehydration of a beta-alkoxypropionamide is the passage of the amide, with or without a diluent, over a silica gel catalyst at a temperature from 350° C. to 500° C. The silica gel catalyst may be silica gel alone, or the silica gel may be activated by impregnation with small amounts of metal oxides, such as the oxides of tantalum, columbium, zirconium or tungsten. When silica gel alone is employed as the catalyst, temperatures of 390 to 475° C. are preferred; but when the activated silica gel catalysts are used, lower temperatures such as 360° C. to 425° C. are preferred.

By the term silica gel is meant a porous, somewhat hydrated silica in which the pores are ultramicroscopic and the intrinsic catalytic activity of the silica becomes practically available by virtue of the large surface accessible to gases. A preferred manner of preparation is described in Patrick United States Patent No. 1,297,724. The activated or promoted silica gel catalysts can be formed by evaporating the silica gel with a solution of a decomposable salt of the metal and roasting the catalyst at about 300° to 400° C. The impregnation can also be accomplished by dipping the silica gel in solutions of these decomposable salts. The nitrate is an effective salt for this purpose, when catalysts containing zirconium or tungsten oxides are to be prepared, and the citrates and oxalates give good results in the case of catalysts promoted with tantalum and columbium oxides. The amount of metal oxide incorporated in the silica gel may vary from 0.1 to 5% by weight of the catalyst.

The silica gel catalysts of this invention are unique in that they catalyze the conversion of the beta-alkoxypropionamides to acrylonitriles rather than to intermediate products, or to decomposition products and tar. Such amounts of intermediate products as are formed may be recycled over the catalyst. The contact time of the amide vapors with the catalyst may vary from 5 to 25 seconds, higher percentage conversion of the beta-alkoxypropionamide being obtained at the higher contact time. If desired, a diluent, such as ethanol, methanol, benzene or water may be included with the propionamide vapors.

The following examples will illustrate the invention:

Example 1

A 6..8% by weight solution of beta-ethoxypropionamide in ethanol was vaporized and the vapors were passed at atmospheric pressure over silica gel at a temperature of 400° C. and a contact time of 15 seconds. The reaction products were condensed and analyzed. Three-fourths (75.1%) of the amide was converted to other products, and of the amide reacted, 62.2% was converted to acrylonitrile, 22.4% to beta-ethoxypropionitrile, 9.6% to acrylamide, and 6.0% to carbon, gases and residue products.

The run was repeated at a catalyst temperature of 450° C. under otherwise identical conditions. At the higher temperature, 90.2% of the beta-ethoxypropionamide was converted to reaction products and of the amide reacted, 76.9% was converted to acrylonitrile, 11.1% to beta-ethoxypropionitrile, 3.4% to acrylamide, 2.5% to carbon, 5.9% to gases, and 0.7% to residue oils.

Example 2

A 68% solution of beta-ethoxypropionamide was vaporized and passed over silica gel at 450° C. and a contact time of 25 seconds. At the higher contact time as compared to the second run of Example 1, more of the amide was converted, but the amount of the converted amide which went to acrylonitrile declined somewhat. Thus, the conversion of the amide was 97%; the distribution of the converted amide by analysis being as follows:

| | Per cent |
|---|---|
| To acrylonitrile | 71.6 |
| To beta-ethoxypropionitrile | 14.3 |
| To acrylamide | 3.1 |
| To gases | 8.5 |
| To carbon | 1.7 |
| To residue oils | 1.2 |
| | 100.4 |

Example 3

A 68% by weight solution of beta-ethoxypropionamide in ethanol was vaporized and the vapors were passed at atmospheric pressure over a silica gel catalyst promoted with blue tungsten oxide and zinc oxide in amount to give 5.8% tungsten and 0.05% zinc at a temperature of 375° C. and a contact time of 15 seconds. The conversion of the amide amounted to 78.8%; 88.7% of the reacted amide being converted to acrylonitrile, 1.4% to beta-ethoxypropionitrile, 7.2% to acrylamide, 2.5% to carbon, and a negligible amount to residue oils and gases.

Example 4

Example 3 was repeated using a silica gel catalyst promoted with 2% tantalum oxide The conversion of the beta-ethoxypropionamide was 72.44%; 66.1% of the reacted amide being converted to acrylonitrile, 13.5% to beta-ethoxypropionitrile, 9.5% to acrylamide, 3.0% to carbon, 7.7% to residue oils, and a negligible amount to gases.

Example 5

A 63% by weight solution of beta-methoxypropionamide in methanol was vaporized and the vapors passed over a silica gel catalyst promoted with 2% tantalum oxide at a temperature of 375° C. and a contact time of 15 seconds. The conversion of the amide was 90%; 89.8% of the reacted amide being converted to acrylonitrile, 6.5% to beta-methoxypropionitrile, 2.3% to acrylamide, 1.0% to residue oils, and a negligible amount to gases.

What is claimed is:

1. Method for making an acrylonitrile of the group consisting of acrylonitrile and methacrylonitrile which comprises vaporizing one of the group consisting of beta-alkoxypropionamide and beta-alkoxy-alpha-methylpropionamide wherein the alkoxy group contains up to six carbon atoms, passing the vapors thus formed over a silica gel catalyst at a temperature of 350° C. to 500° C., and forming a reaction mixture containing an acrylonitrile as the principal nitrogen-containing reaction product.

2. Process for making acrylonitrile which comprises passing beta-ethoxypropionamide in the vapor form over a silica gel catalyst at a temperature of 350° C. to 500° C., and forming a reaction mixture containing acrylonitrile as the principal nitrogen-containing reaction product.

3. Process for making acrylonitrile which comprises passing beta-methoxypropionamide in the vapor form over a silica gel catalyst at a temperature of 350° C. to 500° C., and forming a reaction mixture containing acrylonitrile as the principal nitrogen-containing reaction product.

4. Process for making acrylonitrile which comprises passing a beta-alkoxypropionamide wherein the alkoxy group contains up to six carbon atoms in the vapor form over silica gel at a temperature of 390° to 475° C., and forming a reaction mixture containing acrylonitrile as the principal nitrogen-containing reaction product.

5. Process for making acrylonitrile which comprises passing a beta-alkoxypropionamide wherein the alkoxy group contains up to six carbon atoms in the vapor form over silica gel containing tantalum oxide at a temperature of 360° to 425° C., and forming a reaction mixture containing acrylonitrile as the principal nitrogen-containing reaction product.

6. Process for making acrylonitrile which comprises passing a beta-alkoxypropionamide wherein the alkoxy group contains up to six carbon atoms in the vapor form over silica gel containing tungsten oxide at a temperature of 360° to 425° C., and forming a reaction mixture containing acrylonitrile as the principal nitrogen-containing reaction product.

HELMUT W. SCHULZ.
ALBERT E. PUFAHL.

REFERENCES CITED

The following references are of record in the file of this patent:

UNITED STATES PATENTS

| Number | Name | Date |
|---|---|---|
| 2,334,192 | Handford | Nov. 16, 1943 |
| 2,374,052 | Spence et al. | Apr. 17, 1945 |
| 2,375,005 | Kung | May 1, 1945 |
| 2,393,000 | Seeger | Jan. 15, 1946 |
| 2,455,651 | Bortnick | Dec. 7, 1948 |